United States Patent [19]
Upp

[11] Patent Number: 5,289,507
[45] Date of Patent: * Feb. 22, 1994

[54] CLOCK DEJITTER CIRCUITS FOR REGENERATING JITTERED CLOCK SIGNALS

[75] Inventor: Daniel C. Upp, Southbury, Conn.

[73] Assignee: TranSwitch Corporation, Shelton, Conn.

[*] Notice: The portion of the term of this patent subsequent to Jul. 16, 2008 has been disclaimed.

[21] Appl. No.: 857,928

[22] Filed: May 13, 1992

Related U.S. Application Data

[63] Continuation-in-part of Ser. No. 439,097, Nov. 17, 1989, Pat. No. 5,033,064.

[51] Int. Cl.⁵ .......................... H04L 7/00; H04J 3/06
[52] U.S. Cl. ...................................... 375/118; 370/102
[58] Field of Search .......................... 375/118, 112; 370/105.3

[56] References Cited

U.S. PATENT DOCUMENTS

| | | | |
|---|---|---|---|
| 4,053,715 | 10/1977 | Drapkin . | |
| 4,159,535 | 6/1979 | Fuhrman . | |
| 4,551,830 | 11/1985 | Huttman | 370/15 |
| 4,667,324 | 5/1987 | Graves | 370/102 |
| 4,674,088 | 6/1987 | Grover | 370/100 |
| 4,685,101 | 8/1987 | Segal et al. | 370/84 |
| 4,833,673 | 5/1989 | Chao et al. | 370/94 |
| 5,033,064 | 6/1991 | Upp | 375/118 |

*Primary Examiner*—Curtis Kuntz
*Assistant Examiner*—D. Kobayashi
*Attorney, Agent, or Firm*—David P. Gordon

[57] ABSTRACT

Clock dejitter circuits are provided and comprise control circuits for generating a plurality of pulses over a clock cycle, and clock circuits for tracking the speeds of jittered incoming data signal and based on those speeds, and utilizing the plurality of pulses generating substantially unjittered data signals at the nominal rates of the jittered incoming signals. A control circuit broadly includes a divide by value x-divide by value x+1 circuit which receives a fast input clock signal, a modulus y counter, and a count decode for providing z control pulses over the count of y, and a logic gate for taking the outputs from the count decode and controlling the divide block to guarantee hat the divide block divides the fast input clock signal by value x q times for every r times the divide block divides the fast input clock signal by value x+1; wherein q plus r equals y, and z equals either q+1 or r+1.

21 Claims, 6 Drawing Sheets

CLOCK DEJITTER CIRCUITS FOR REGENERATING JITTERED CLOCK SIGNALS

This is a continuation-in-part of Ser. No. 07/439,097 filed on Nov. 17, 1989, now U.S. Pat. No. 5,033,062 which is hereby incorporated by reference herein in its entirety.

BACKGROUND OF THE INVENTION

This invention relates generally to digital circuits for regenerating a jittered clock signal. More particularly, this invention relates to a dejitter circuit which receives a jittered telecommunications signal, and which uses a clock source of higher frequency for regenerating the telecommunications signal at the rate of the incoming telecommunications signal.

DS0, DS1, DS2, and DS3 telecommunications signals are well defined according to CCITT specifications. Essentially,, a DS0 signal is a signal having a bit rate of 64 Kbits/sec. DS1 signal is comprised of twenty-four DS0 segments plus overhead for a total bit rate of 1.544 Mbits/sec (plus or minus approximately 200 b/sec). In turn, four DS1 signals plus some overhead (bit stuffing) constitute a 6.312 Mb/sec DS2 signal, and four DS2 signals plus some additional overhead constitutes a 44.736 Mb/sec DS3 signal.

DS3 signals are commonly used between central offices for high speed communication. When the DS3 signal is received, it is often demultiplexed into its seven composite DS2 signals, with the bit stuffing utilized for control and essentially removed from the DS2 signals. In turn, the DS2 signals are often demultiplexed into their four composite DS1 signals with the DS2 bit stuffing utilized for control and essentially removed from the resulting DS1 signals. Each resulting DS1 signal has a bit rate of approximately 1.544 Mb/sec plus or minus 200 b/sec. However, because in generating the DS1 signal the overhead or stuffing bits are removed, the bit stream of the DS1 signal is gapped or "jittered". Additional jitter termed "transport" or "systematic" jitter is also found in the DS1 signal due to the fact that all systems introduce noise into the signals which they are carryinq. Jitter is undesirable as it can introduce error in the decoding of the signal.

With the advent of the optical network, additional telecommunication signals have been defined according to CCITT specifications. The basic SONET signal is an STS-1 signal having a bit rate of 51.84 Mb/sec. An STS-3 signal (155.52 Mb/sec) has three times the bit rate of the STS-1 signal. Often the STS-1 or STS-3 signals are used to carry the data payloads of DS0, DS1, DS2 and DS3 signals. In fact, the STS signals can also be required to carry the data payload of standard European signals such as a 2.048 Mb/sec signal.

Standard devices such as phase locked loops are known in the art for tracking signal rates and for generating a clock of the nominal received rate for eliminating jitter. Phase locked loops however, have several drawbacks including expense and the requirement of analog implementation. The subject invention eliminates the need for a phase locked loop through the use of a small amount of digital circuitry capable of implementation on a small section of an LSI circuit.

SUMMARY OF THE INVENTION

It is therefore an object of the invention to provide a digital circuit for regenerating a clock signal for a jittered DS1 signal at the nominal rate of the jittered DS1 signal.

It is another object of the invention to provide a dejitter circuit capable of servicing a plurality of DS1 signals, the dejitter circuit including a common control circuit and a plurality of individual clock circuits.

It is a further object of the invention to provide a digital circuit for regenerating any first clock signal accompanying a jittered telecommunications signal at the nominal rate of the jittered telecommunicaitons signal using a substantially faster second clock signal.

In accord With the objects of the invention, a clock dejitter circuit broadly comprises control circuit means for generating a plurality of pulses over a clock cycle, and a clock circuit for tracking the speed of a jittered incoming data signal and based on that speed, and utilizing the plurality of pulses, generating a substantially unjittered data signal at the nominal rate of the jittered incoming signal.

The control circuit broadly includes a divide by value x -divide by value x+1 circuit which receives a fast input clock signal, a modulus y coutner which indexes on the output of the divide circuit, and a count decode for providing z control pulses over the count of y, and a logic gate for taking the outputs from the count decode and controlling the divide block to guarantee that the divide block divides the fast input clock signal by value x q times for every r times the divide block divides the fast input clock signal by value x+1; wherein q plus r equals y, and z is preferably equal to either q+1 or r+1. In this manner an average slower telecommunications clock having a substantially standard rate is obtained from the divide block.

The clock circuit includes a FIFO, a clock rate controller, and a divide by x - divide by x+1 block. The FIFO receives the incoming jittered signal, and provides the outgoing communications clock signal according to a rate set by the clock rate control and divide block. Nominally, the divide by x - divide by x+1 circuit divides by x z-1 times in a cycle of y divide cycles. The clock rate controller senses how well the FIFO is, and using that information along with the pulses from the common control means regulates the divide block. If data is being pulled from the FIFO at too great a rate, the FIFO becomes too empty, and the control means must slow down the output by dividing by x either z or z+2 times in a cycle of y divide cycles. Conversely, if the data is being pulled too slowly from the FIFO, the FIFO fills up, and the control means must increase the data output rate. The controller increases or decreases the data output by causing the divide block to divide the fast input clock signal by x either q−1, q, or q+1 times in a y count cycle. In this manner, the time duration of a cycle of y clock cycles is increased or decreased by one period of the fast clock, and the capability of tracking the average frequency of the jittered signal is obtained.

To dejitter a DS1 signal by using a faster DS3 input clock signal, the control circuit preferably includes a divide by 28 - divide by 29 circuit which receives a 44.736 Mb/sec (DS3) input clock signal, a modulus 193 counter, a count decode for providing six control pulses over the one hundred ninety-three count, and a logic gate for taking the outputs from the count decode and controlling the divide block to guarantee that the divide block divides the DS3 signal nominally by twenty-nine one hundred eighty-eight times for every five times the divide block divides the DS3 signal by twenty-eight. In this manner an average clock of 1.544 Mb/sec (the standard DS1) rate is obtained from the divide block. Then, by changing the divide by twenty-eight from five times to either four or six times, is needed, the ability to track the jittered signal average frequency is produced.

The six control pulses are preferably provided on three lines, with four pulses occurring during the one hundred ninety-three count cycle can one line, and one pulse occurring during the cycle on each of the other two liens; all six pulses being non-overlapping in time. The clock rate controller increases or decreases the data output rate by causing the divide block to divide the DS3 signal by twenty-eight either four, five, or six times in a one hundred ninety-three clock cycle. In this manner, the total time duration of one hundred ninety-three clock cycles is varied by +22 nanoseconds from the nominal one hundred twenty-five microsecond period, and thus the average rate of the jittered signal can be tracked.

Where it is desired to dejitter a plurality of DS1 signals, a single common means can be used to supply the six control pulses to a plurality of clock circuits.

To dejitter a DS1 signal by using a faster STS-1 input clock signal, the control circuit preferably includes a divide by 33 - divide by 34 circuit which receives a 51.84 Mb/sec (STS-1) input clock signal, a modulus 179 counter, a count decode for providing seventy-seven control pulses over the one hundred seventy-nine count, and a logic gate for taking the outputs from the count decode and controlling the divide block to guarantee that the divide block divides the STS-1 signal by thirty-four one hundred and three times for every seventy-six times the divide block divides the STS-1 signal by thirty-three. In this manner an average clock of 1.5439 Mb/sec which is approximately the standard DS1 rate (which is 1.544 Mb/sec) is obtained from the divide block. This average clock may then be varied by altering the number of divide by thirty-three instances in the cycle of one hundred seventy-nine cycles, to allow tracking of the average frequency of the jittered signal.

To dejitter a jittered European telecommunications 2.048 Mb/sec signal by using a faster STS-3 input clock signal, the control circuit preferably includes a divide by 28 - divide by 29 circuit which receives a signal three/eighths the rate of a 155.52 Mb/sec (STS-3) input clock signal, a modulus 229 counter, a count decode for providing one hundred and ten control pulses over the two hundred twenty-nine count, and a logic gate for taking the outputs from the count decode and controlling the divide block to guarantee that the divide block divides the ⅜ (STS-3) signal by twenty-eight one hundred and twenty times for every one hundred nine times the divide block divides the STS-1 signal by twenty-nine. In this manner an average clock of 2.048047 Mb/sec which is approximately the standard European rate of 2.048 Mb/sec is obtained from the divide block. The average clock may then be varied by altering the number of divide by twenty-eight instances in the cycle of two hundred twenty-nine cycles, to allow tracking of the average frequency of the jittered signal.

Additional objects and advantages of the invention will become apparent to those skilled in the art upon reference to the detailed description taken in conjunction with the provided drawings.

BRIEF DESCRIPTION OF THE DRAWINGS

FIG. 2b is a wave form and bit value diagram for a typical twenty-nine divide cycle according to the dejitter circuit of FIG. 2a;

DETAILED DESCRIPTION OF THE PREFERRED EMBODIMENT

Figure 1A:
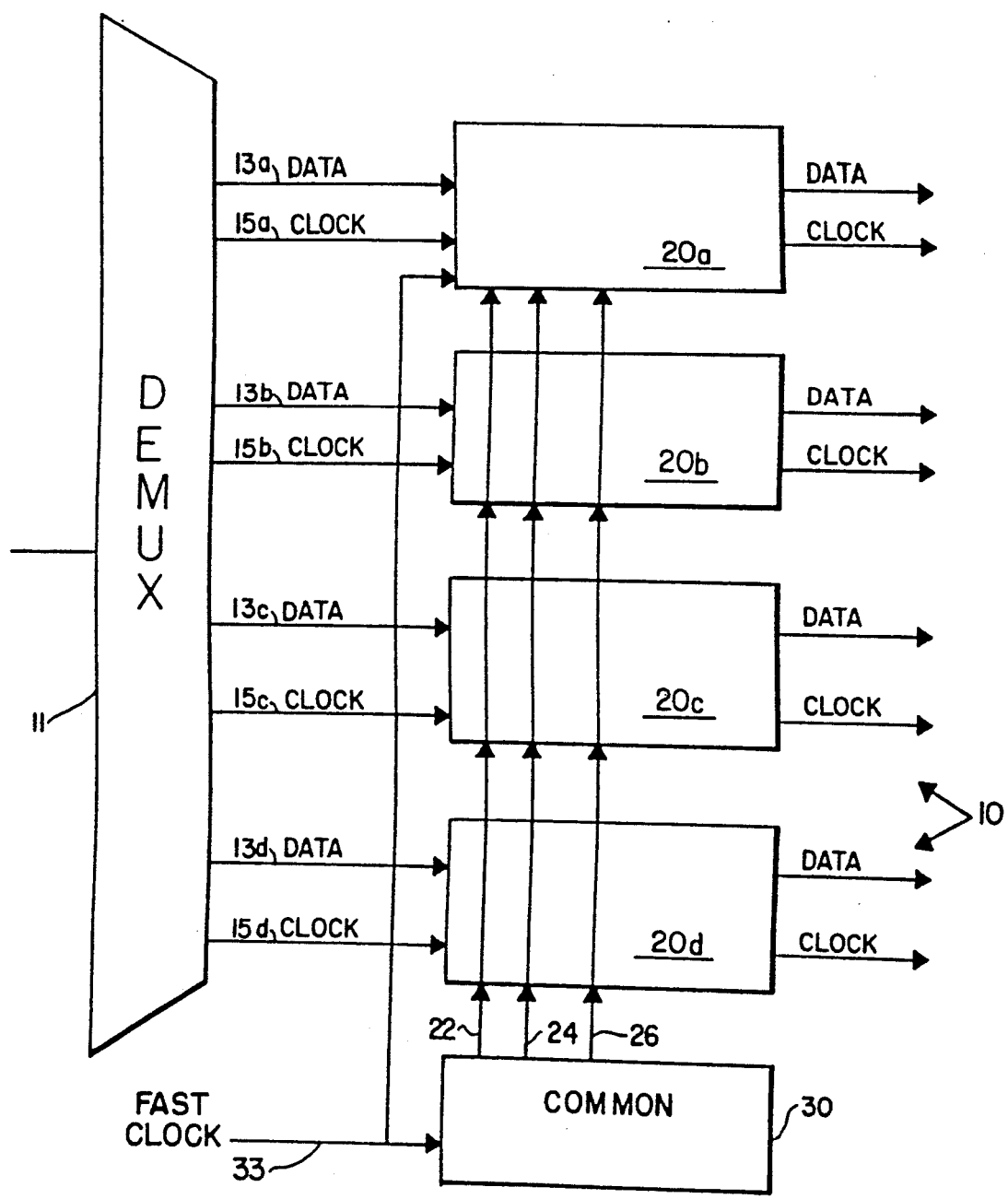
FIG. 1a is a high level diagram of the dejitter circuit of the invention having a single common control circuit and a plurality of clock circuits.

Turning to FIG. 1a, a dejitter circuit 10 for regenerating telecommunication signals is seen. The jittered telecommunication signals are often outputs form a demultiplexer 11 and include a plurality of data lines and clock signals such as data liens 13a–13d, and 15a–15d. The data and clock signals are input input into clock circuits 20a–20d of the dejitter circuit. Other inputs into the clock circuits 20a–20d are three lines of control output 22, 24, and 26 from the common control circuit 30, and a relatively fast clock 33.

Figure 1B:
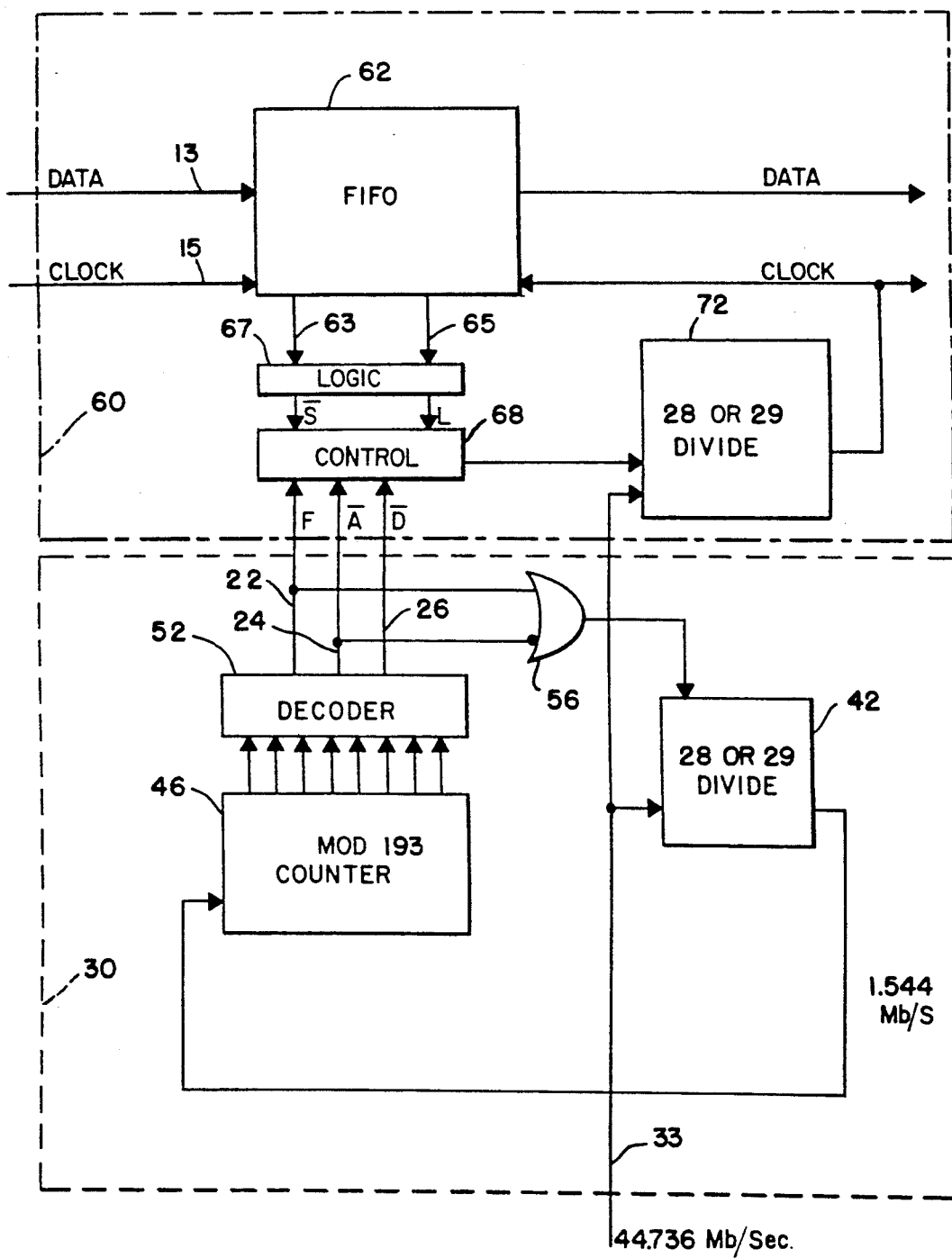
FIG. 1b is a block diagram of the common control circuit and a single clock circuit for providing a dejittered DS1 signal, using a DS3 fast clock signal.

More detail of the common control circuit 30 and a single clock circuit 20 is seen in block diagram form in FIG. 1b, where the data signal 13 is a jittered signal at an average DS1 rate, and the fast clock is a 44.736 Mb/sec DS3 clock. The common control circuit 30 has the 44.736 Mb/sec clock 33 as an input into a divide block 42, details of which are discussed hereinbelow with reference to FIG. 2a. The purpose of divide block 42 is to take the 44.736 Mb/sec clock signal and divide it down so as to create a clock signal with an average frequency of 1.544 Mb/sec (i.e. the DS1 frequency). The 1.544 Mb/sec average frequency is obtained by dividing the 44.736 Mb/sec clock by twenty-nine a desired number of times and by dividing the 44.736 Mb/sec clock by twenty-eight a different number of times during a cycle. In particular, in a cycle of one hundred and ninety-three, the 44.736 Mb/sec clock should be divided by twenty-nine exactly one hundred eighty-eight times, and by twenty-eight exactly five times in order to obtain the 1.544 Mb/sec average frequency. Preferably, the five divide by twenty-eight's should be distributed over the one hundred eighty-eight divide by twenty-nine's in order to minimize clock skew.

The output of the divide block 42 is provided to a mod one hundred ninety-three counter 46 which is preferably implemented as an eight bit linear feedback shift register of standard design with a reset after the one hundred ninety-third count. Coupled to the counter 46 is a decoder 52 which is arranged to provide an output pulse (active high) signal on six counts over the one hundred ninety-three count cycle. Preferably, four of the output pulses are provided on output control line 22, while a single output pulse (active low) is provided on output control lines 24 and 26. Output control line 22 pulses on counts zero, forty-eight, ninety-six and one hundred forty-four, while control line 24 pulses on count twenty-four, and control line 26 pulses on count one hundred twenty. Decoder 52 is thus set in a conventional manner to accommodate those requirements. It will be appreciated, of course, that other counts could be utilized to control when control lines 22, 24, and 26 pulse, provided that control line 22 pulses four times, and control lines 24 and 26 once each over the one hundred and ninety-three cycle. It will also be appreciated that the mod one hundred ninety-three counter could be a binary or other type counter rather than being implemented as a linear feedback shift register.

As indicated in FIG. 1b, control lines 22 and 24 are coupled via NOR gate 56 (with an inverted input for line 24) to the divide block 42. Whenever the output on either control line 22 or control line 24 pulses, the signal is passed to divide block 42, and divide block 42 divides by twenty-eight instead of twenty-nine. Since control line 22 goes high exactly four times and control line 24 goes high exactly once over the cycle of one hundred ninety-three, divide block 42 divides by twenty-eight five times and by twenty-nine one hundred eighty-eight times as desired.

The control lines 22, 24, and 26 are fed to the clock circuit means 60, which basically includes a FIFO 62, a logic block 67, a control circuit 68, and another divide block 72. Divide block 72 also has the DS3 clock of 44.736 Mb/sec as an input. The output of divide block 72 serves as the output clock for FIFO 62 and also serves to clock out the data from FIFO 62.

FIFO 62 is preferably a twelve bit FIFO with leads 63 and 65 from the the fifth and seventh registers respectively. The leads 63 and 65 indicate whether data is found in the fifth and seventh registers of the FIFO 62. If data from data line 13 is being clocked into the FIFO 62 at a frequency of 1.544 Mb/sec, FIFO 62 will typically have data in six registers only, and the lead 63 from the fifth register will indicate the presence of data, while the lead 65 from the seventh register will indicate the lack of data. If data from data line 13 is being clocked into the FIFO 62 at a frequency greater than 1.544 Mb/sec, data will build in the FIFO if the data output from FIFO 62 is at 1.544 Mb/sec. As data builds in the FIFO, both leads 63 and 65 will indicate the presence of data, and a data "long" condition will be established by logic block 67 and sent as a positive pulse to the "L" input of control circuit 68. Conversely, if data from data line 13 is being clocked into the FIFO at a frequency less than 1.544 Mb/sec, and the output from FIFO 62 is at 1.544 Mb/sec, the data held by the FIFO 62 will decrease. As a result, both leads 63 and 65 will indicate the lack of data, and a data "short" condition will be established by logic block 67 and sent as a active low pulse to the S input to control circuit 68.

If a data "long" or data "short" condition is established, it means that the output rate from the FIFO is not matching the input rate. The output clock being generated by the divide block 72 must be adjusted accordingly. The control circuit 68 uses the status information from the FIFO to cause the pulses coming from the common circuit to appropriately control the divide block 72. In particular, at a minimum, the divide by twenty-eight should be actuated four times per cycle of one hundred ninety-three, and at a maximum, the divide by twenty-eight should be actuated six times per cycle of one hundred ninety-three. In fact, if the divide by twenty-eight is actuated only four times per cycle, the output 1.5437 Mb/sec, while if the divide by twenty-eight is actuated six times, the output frequency will be approximately 1.5443 Mb/sec. Of course, these frequencies are slightly outside of the permissible range for a DS1 signal. Thus, to obtain a permissible DS1 output clock, actuation of the divide by twenty-eight either four or six times in a cycle of one hundred ninety-three should only occur at most two out of every three one hundred ninety-three cycles.

The output of divide block 72 acts as the read clock of the FIFO 62. Since logic block 67 derives signals L and S from an observation of the data length in FIFO 62, and since these observations are used to control the number of divide by twenty-eight and divide by twenty-nine cycles performed by the divide block 72, the entire loop is self-adjusting. Hence, the loop uses the correct number of frames at 1.544 Mb/sec and at 1.5437 or 1.5443 Mb/sec to guarantee that the output average frequency from FIFO exactly matches the average frequency of data being received by the FIFO from the DS1 source. The data clocked out of FIFO in this manner is relatively jitter free.

Figure 2A:
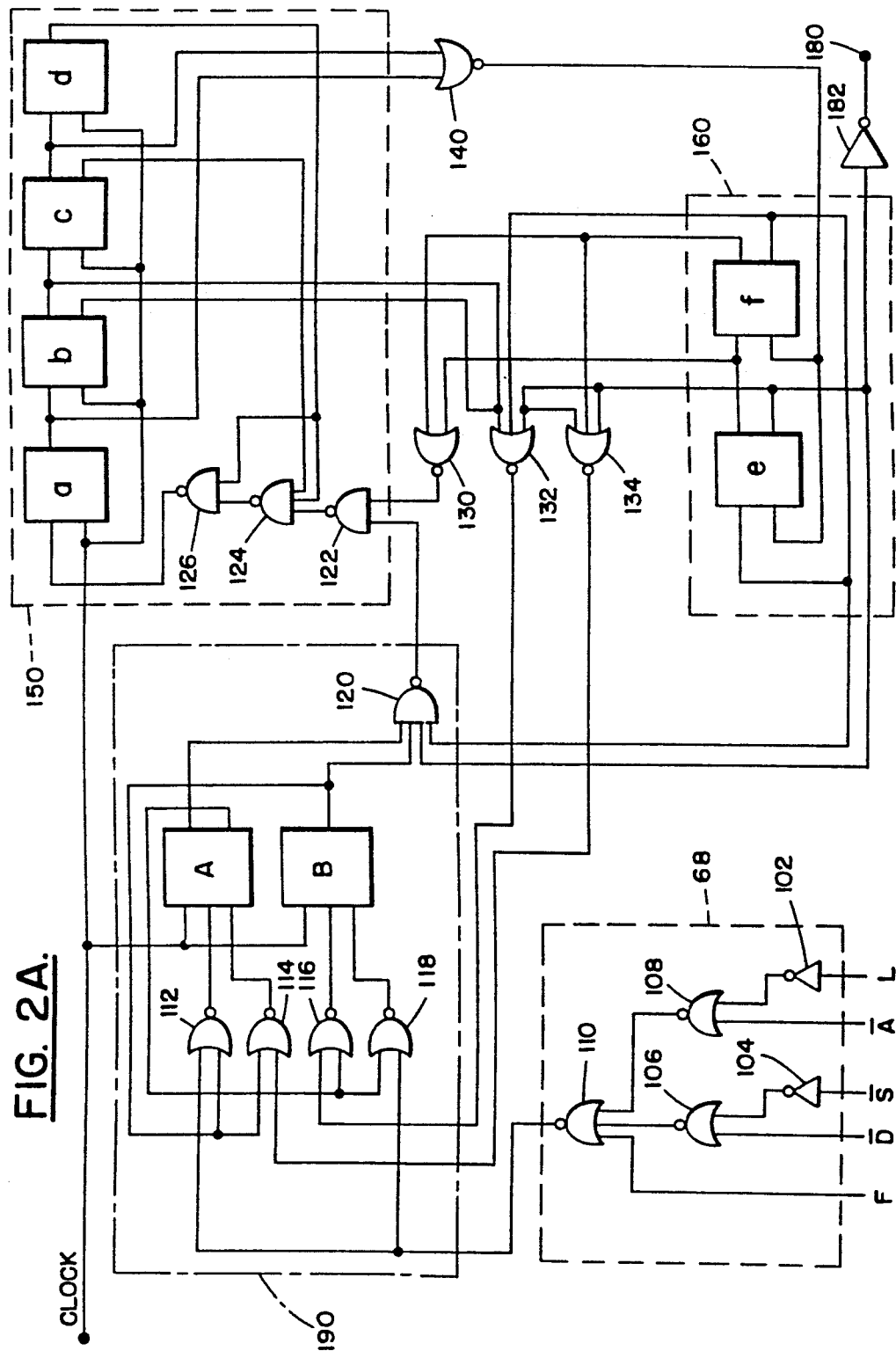
FIG. 2a is a block diagram of the divide block of the dejitter circuit of FIG. 1b.

Turning to FIG. 2a, details of the control circuit 68 and the divide block 72 are seen in detail (divide block 42 being essentially the equivalent of divide block 72). The inputs into control circuit 68 are the control lines 22, 24, and 26 from common control circuit 30, and the short and long lines 63 and 65 from the FIFO, which are indicated as F, D (delete), A (add), S (short) and L (long) respectively. The F input is fed directly to NOR gate 110, and causes the output of NOR gate to go low at least four times in the one hundred ninety-three count cycle. As will be discussed hereinafter, NOR gate 110 going low causes the divide block 72 to divide by twenty-eight instead of twenty-nine.

Another condition which causes NOR gate 110 to go low is when the delete decode line is pulsed when the buffer is not short. When the delete decode signal D is pulsed (active low), but the FIFO is not short (S is high), the short line is inverted by inverter 104, and the inputs into NOR gate 106 consist of the low output from inverter 104 and the active low input from the delete decode control. With two low inputs, NOR gate 106 goes high and forces the output of NOR gate 110 low. Thus, when the buffer is not short, a fifth divide by twenty-eight is accomplished upon the control line 24 being pulsed.

The last situation which can cause NOR gate 110 to go low is when the buffer is long and the add decode line is pulsed. The buffer long line L is inverted by inverter 102, and together with the add decode signal is input to NOR gate 108. Thus, if the FIFO is long (L high), and the add decode is pulsed (A active low pulse), the output of NOR gate 108 goes high. As a result, the output of three gate NOR 110 goes low, and a sixth divide by twenty-eight is accomplished in the cycle of one hundred ninety-three.

When the FIFO is short, only four divide by twenty-eight's are accomplished instead of the six which occur when the buffer is long. If the FIFO is short (S is low) when the delete decode signal is pulsed, the short line is inverted by inverter 104, and the inputs into NOR gate 106 consist of the high output from inverter 104 and the active low of the delete decode line. The high output from inverter 104 causes the output of NOR gate 106 to go low, thereby causing the output of NOR gate 110 to go high. As a result, when the FIFO is short, the delete decode signal coming from the common circuit does not cause a divide by twenty-eight (i.e. a divide by twenty-eight is deleted from the cycle). Similarly, when the FIFO not long when the add decode line is pulsed, NOR gate 108 has a high value received from inverter 102 which keeps the NOR gate 108 output low. With NOR gate 108 low, NOR gate 110 is kept high, and the divide by twenty-eight is avoided (i.e. a divide by twenty-eight is not added to the cycle).

The output of NOR gate 110 is fed to a state machine 190 which is comprised of NOR gate 112, NAND gate 114, NOR gate 16, NAND gate 118, JK flip-flops A and B, and 4-input NAND gate 120. The state machine functions as a deglitcher for the inputs as well as a synchronizer for synchronizing the signal output from NOR gate 110 as represented by NAND gate 120 with the signal output from NOR gate 130. Effectively, the state machine permits the state of NOR gate 110 (which is controlled by the controller) to enter NAND gates 122, 124 and 126 via NAND gate 120 so that control of a twenty-eight or a twenty-nine divide is effectuated.

Figure 2B:
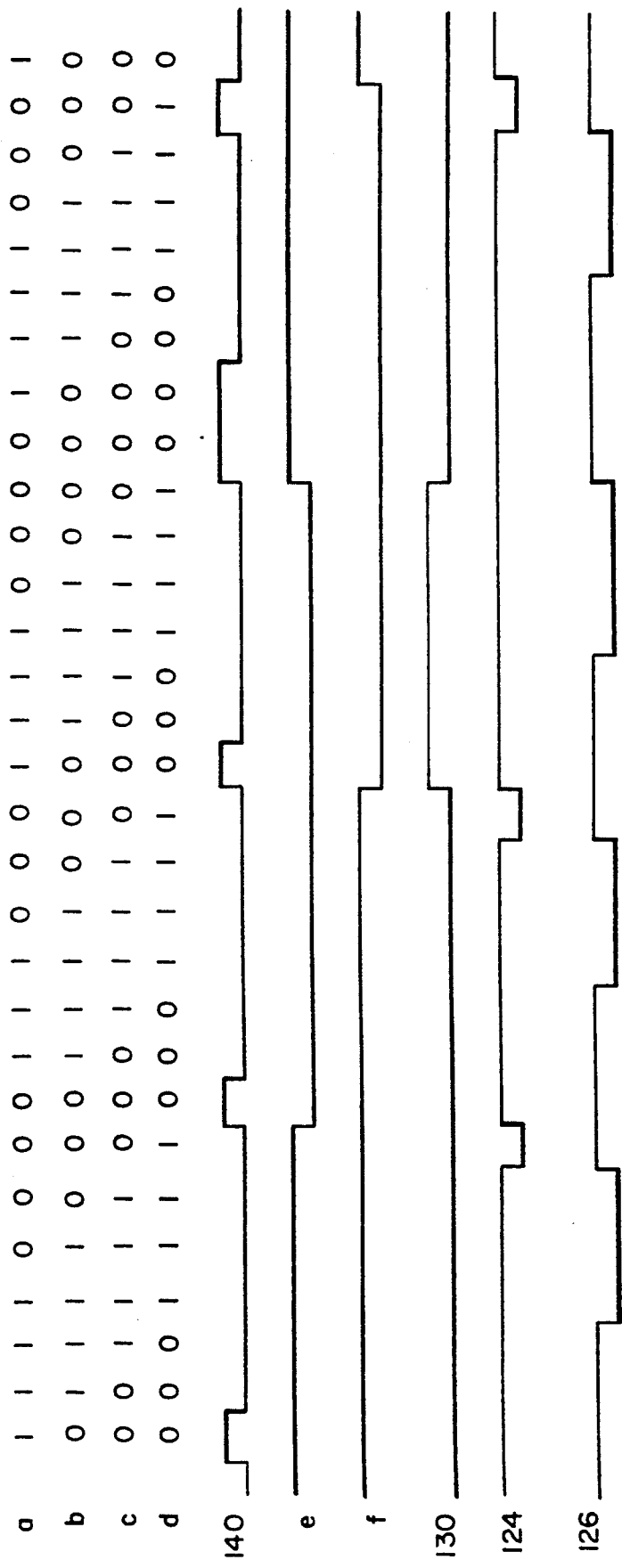

The divide by twenty-eight or divide by twenty-nine is implemented as two sets of shift-register counters. A first counter 150 is comprised of D1 flip-flops a, b, c, and d which have the DS3 clock as their clock inputs. The DQ flip-flops cycle through either a seven or an eight number cycle as will be described below. The eight number cycle is: while the seven number cycle is the same except it omits state 0000 and starts at 1000 instead (the outputs of flip-flops a, b, c, and d being seen in FIG. 2b in a twenty-nine count cycle). The Q output of flip-flop d is fed back via NAND gate126 to the D input of flip-flop a. Thus, when the output of d is a "0", the input to a is a "1". When the output of d is a "1", the input to a is dependent on the output of NAND gate 124. The not Q output of flip-flop c and the Q output of flip-flop d together help control the output of NAND gate 124. Generally, the output of NAND gate 124 is "1", unless the not Q output of flip-flop c is "1" and the output of flip-flop d is "1". This state only occurs when the number cycle is at the last number "0001". In such a situation, the output of NAND gate 124 is the inverse of NAND gate 122, and the output of NAND gate 122 controls the input into flip-flop a. Thus, if at the end of the number cycle NAND gate 122 is a value "1", a "1" will appear at the D input into flip-flop and the number cycle will start at "1000", while if at the end of the number cycle a "0" appears at the output of NAND gate 122, a "0" will appear at the D input into flip-flop a and the number cycle will start at "0000". Effectively, NAND gate 122 controls whether counter 150 will be a seven cycle counter or an eight cycle counter.

Control of NAND gate 122 is based on two factors: the output from NAND gate 120 of the state machine (which is based on the control logic of the controller), and the state of the four counter 160 which is also implemented as a shift register. Counter 160 includes flip-flops e and f. The clock inputs into flip-flops e and f are derived from the Q outputs of flip-flops a and c which are fed to NOR gate 140. Thus, a positive clock pulse only occurs when the Q outputs of flip-flops a and c are both "0". Because flip-flops a and c change to both "0" only once during the seven or eight count cycle of counter 150 (as the first count of the eight count cycle has both "0" which is not a change) the state of flip-flops e and f are only changed once every seven or eight count cycle (as seen by the 140 wave form of FIG. 2b).

Because of the way flip-flops e and f are arranged with the Q output of e acting as the D input into f, and the not Q output of f acting as the D input into e, the four counter 160 cycles through the following count: 00 10 11 01. As the circuit output 180 is taken from the not Q output of flip-flop e (via inverter 182), the output only changes once in the cycle of the four counter 160 (as seen by the e and f waveforms of FIG. 2b). Thus, depending on how often the clock input from NOR gate 140 is pulsed, a divide by twenty-eight or divided by twenty-nine is accomplished.

The Q output from flip-flop f and the not Q output from flip-flop e are fed to NOR gate 130 which acts as an input into NAND gate 122. Thus, the input into NOR gate 130 follows the cycle: 10 00 01 11, and the output from NOR gate 130 goes high only once during the cycle (as seen by the 130 wave form of FIG. 2b). When the output from NOR gate 130 goes high, an opportunity exists to create an eight count for counter 150 (e.g. a twenty-nine count for the counter). If output from NAND gate 120 is high when the output from NOR gate 130 goes high, the output from NAND gate 122 goes low forcing the output from NAND 124 high which in turn forces the output from NAND gate 126 low. With a low input into flip-flop a, the counter 150 starts at 0000 rather than at 1000, and an eight count is effectuated. In the normal sequence, the output from NAND 120 stays high such that every fourth count through the four counter 160, both inputs to NAND 122 are high and cause a zero input into flip-flop a. However, where it is desired to effectuate a twenty-eight count instead of a twenty-nine count, the output of NOR gate 110 is forced low. As a result, the output of NAND gate 120 is forced low when the output of NOR gate goes high, and instead of two high inputs into NAND gate 122, a high and a low input are provided and keep the output of NAND gate 122 high. With the output of NANO gate 122 high, at the end of the cycle of counter 150, the D input into flip-flop a is high, and counter 150 starts a seven cycle count instead of the eight cycle count. As a result, a twenty-eight divide is effectuated rather than a twenty-nine divide.

For sake of completeness, it should be noted that the not Q output of flip-flop e and the Q output of flip-flop f are fed to 3-input NOR gate 134 which in turn is an input into NAND gate 114 of the state machine 190. Similarly, the not Q output of flip-flop e and the not Q output of flip-flop f are fed to 3-input NAND gate 132, which in turn is an input into NOR gate 116 of the state machine. The not Q outputs from flip-flops e and f are also fed as inputs to four input NAND gate 120. The other inputs into NAND gate 120 come from flip-flops A and B of the state machine 190. Other inputs into the state machine 190 include the output of NOR gate 110 which is input into NOR gate 112 and NAND gate 118, as well as the output from flip-flop B which is fed back to the inputs of NOR gate 112 and NAND gate 114, as well as being fed forward to four-input NAND gate 120.

Figure 3:
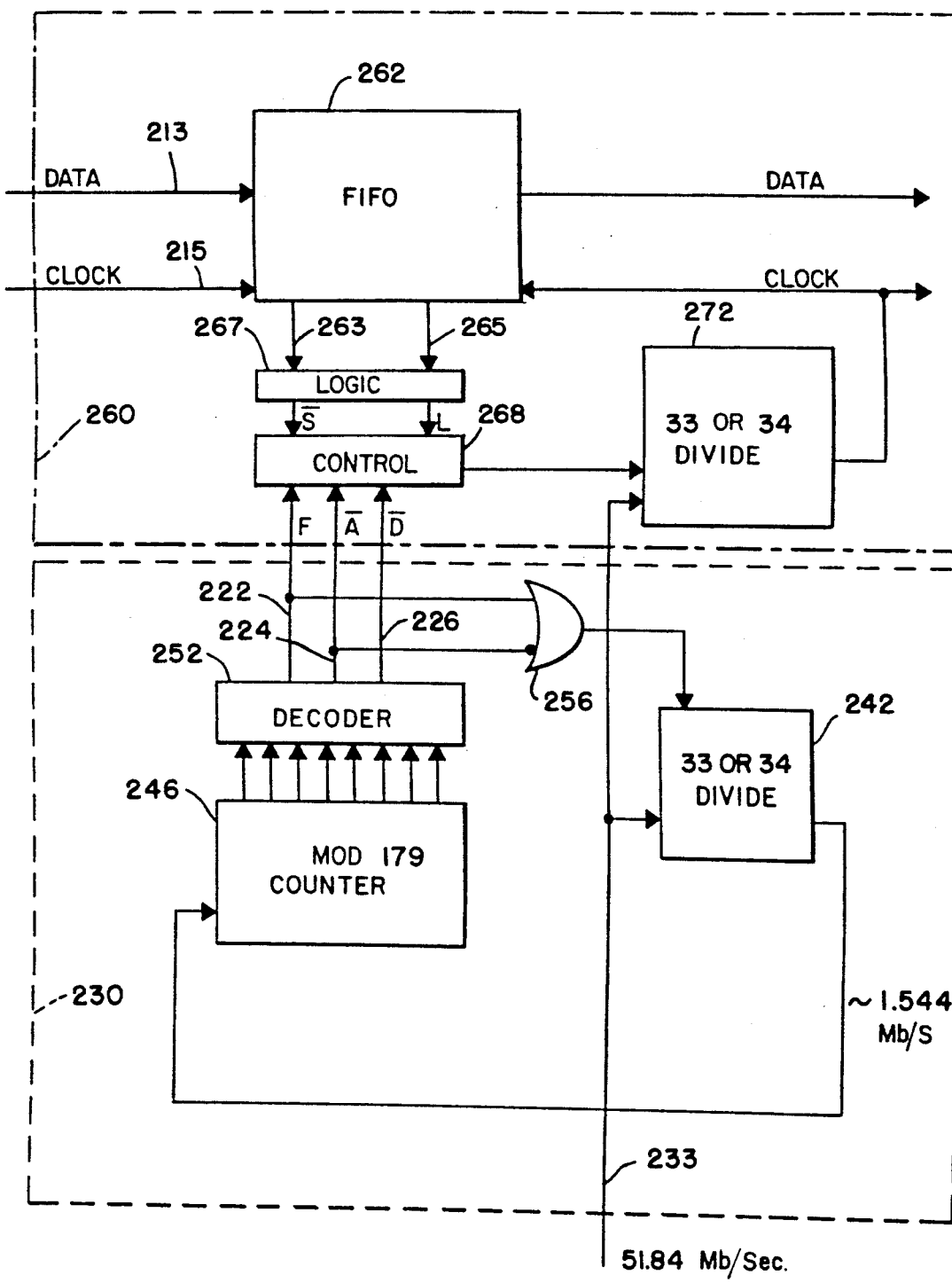
FIG. 3 is a block diagram of a common control circuit and a single clock circuit for providing a dejittered DS1 signal, using a STS-1 fast clock signal.

Turning to FIG. 3, another common control circuit 230 and clock dejitter circuit 260 are seen. The circuit of FIG. 3 is substantially similar to that of FIG. 1b, with similar blocks having numbers removed by two hundred. Thus, the incoming data signal is designated 213 with the incoming clock designation being 215. The primary differences between the block diagram of FIG. 3 and that of FIG. 1b are that the fast clock 233 is an STS-1 clock at 51.84 Mb/sec, the divide blocks 242 and 272 are thirty-three or thirty-four divides, the counter 246 is a mod one hundred seventy-nine counter, and decoder 252 generates seventy-five pulses on the F control line 222. With such an arrangement, under typical conditions (FIFO 262 neither long nor short), the divide block 242 divides the STS-1 signal by thirty-four one hundred and three times for every seventy-six times the divide block divides the STS-1 signal by thirty-three. In this manner an average clock of 1.5439 Mb/sec which is approximately the standard DS1 rate (which is 1.544 Mb/sec) is obtained from the divide block. If the FIFO is short as determined by logic block 267, the seventy-five pulses on the F line 222 will cause a divide by thirty-three, but the pulses on the A and D lines 224 and 226 will be ignored and divides by thirty-four will be generated. As a result, over a cycle of one hundred seventy-nine counts, the divide by thirty-three will be executed seventy-five times by divide block 272, the divide by thirty-four will be executed one hundred and four times by divide block 272, and an output signal at approximately 1.54373 Mb/sec is generated. Similarly, if the FIFO is long, during the A and D pulses, a divide by thirty-three will be executed. As a result, over a cycle of one hundred seventy-nine counts, the divide by thirty-three will be executed seventy-seven times by divide block 272, the divide by thirty-four will be executed one hundred and two times by divide block 272, and an output signal at approximately 1.54424 Mb/sec is generated.

Because the signal generated by the common control circuit 230 is not exactly 1.544 Mb/sec, if the nominal rate of the data signal on data line 213 is exactly 1.544 Mb/sec, the FIFO will tend to go long a little more often than otherwise. However, compensation for this tendency is accomplished by the logic and control circuits 265 and 268.

It should be appreciated that in the common control circuit 230 of FIG. 3, a mod one hundred seventy-nine counter 246 is purposefully utilized instead of a mod one hundred ninety-three counter such as used in FIG. 1b. With a mod one hundred ninety-three counter 246, the decoder 252 would have received a signal from the counter 246 at an 8Kb/sec frequency. While such a rate is suitable where DS3 signals are involved (such in the system of FIG. 1b), as the sampling rate of stuff bits in the DS3 signal is 5.367 Kb/sec, and 8 Kb/sec and 5.367 Kb/sec are mutually prime relative to each other, it is not suitable where STS-1 signals are involved, as the sampling signal of the stuff in an STS-1 Signal is 2 Khz; 8 Khz being a harmonic of 2Khz. Thus, a mod one hundred seventy-nine counter was utilized to avoid harmonics in the system which could cause the system to malfunction.

Figure 4:
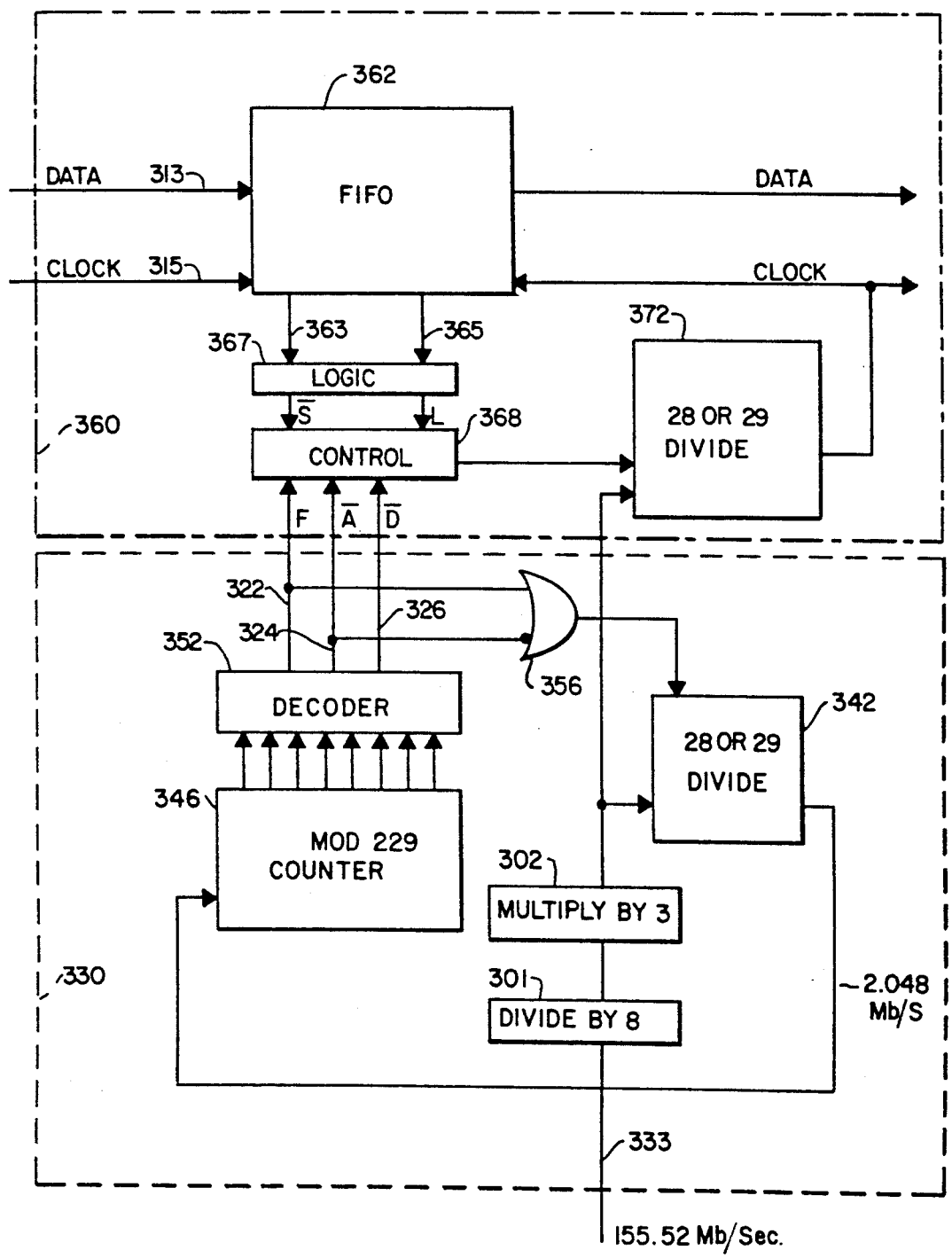
FIG. 4 is a block diagram of a common control circuit and a single clock circuit for providing a dejittered 2.048 Mb/sec signal, using a STS-3 fast clock signal.

A final example of a dejitter circuit according to the invention is seen in FIG. 4 which is provided to dejitter a jittered European telecommunications 2.048 Mb/sec ±103 b/sec signal by using a fast STS-3 input clock signal. FIG. 4 is again similar to FIG. 1b, with similar blocks having numbers removed by three hundred. The primary differences between the circuit of FIG. 4 and that of FIG. 1b, are that the incoming data 313 is at an average rate of 2.048 Mb/sec, the fast data clock 333 is an STS-3 clock at 155.52 Mb/sec, a divide by eight block 301 and multiply by three block 302 are added to help divide down the STS-3 clock 333 to form a 58.32 Mb/sec fast clock at ⅜ the rate of the STS-3 clock, the counter 346 is a mod two hundred twenty-nine counter, and the decoder 352 provides one hundred eight pulses on the F control line 322. With the divide block 372 dividing the ⅜ (STS-3) or 58.32 Mb/sec signal by twenty-eight one hundred and twenty times for every one hundred nine times the divide block divides the ⅜ (STS-3) signal by twenty-nine, an average clock of approximately 2.048042 Mb/sec which is approximately the standard European rate of 2.048 Mb/sec is obtained from the divide block 372. Where divide block 372 divides the ⅜ (STS-3) fast clock by twenty-eight one hundred nineteen times or every one hundred ten times the divide block divides the ⅜ (STS-3) signal by twenty-nine, an average clock of approximately 2.047728 Mb/sec is obtained. Where divide block 372 divides the ⅜ (STS-3) fast clock by twenty-eight one hundred and twenty-one times for every one hundred eight times the divide block divides the ⅜ (STS-3) signal by twenty-nine, an average clock of approximately 2.048356 Mo/sec is obtained.

Because the signal generated by the common control circuit 330 is not exactly the nominal frequency of a standard telecommunications signal, if the nominal rate of the data signal on data line 313 is exactly the European standard 2.048 Mb/sec, the FIFO will tend to go long a short more often than otherwise. However, compensation for this tendency is accomplished by the logic and control circuits 365 and 368.

There has been described and illustrated herein clock dejitter circuits for regenerating telecommunication signals. While particular embodiments have been illustrated and described, it is not intended the invention be limited thereto, as it is intended that the invention be as broad in scope as the art will allow and that the specification be read likewise. Thus, while particular circuitry was described for effectuating a divide by twenty-eight - divide by twenty-nine block, those skilled in the art will appreciate that other circuitry could be utilized to accomplish the same, and that similar circuitry could be utilized for effectuating a divide by thirty-three or thirty-four block, or any other divide block desired. For example, with regard to the divide by twenty eight - divide by twenty-nine block, the shift registers used as counters could be replaced with binary counters. Likewise, instead of separating the divide block into a divide by seven or eight counter and a divide by four counter, a single divide by twenty-nine counter could be provided with control circuitry to divide by twenty-eight in the given circumstances. Also, while a twelve bit FIFO buffer was described with taps at the fifth and seventh bit to determine the fullness state of the buffer, it will be appreciated that a different sized buffer could be utilized with taps at different bit locations. Thus, it will be apparent to those skilled in the art that other changes and modifications may be made to the invention as described in the specification without departing from the spirit and scope of the invention as so claimed.

I claim:

1. Apparatus for regenerating a jittered data stream of a first standard telecommunications signal, said apparatus having a second standard telecommunications clock signal as an input thereto, said second standard telecommunications clock signal being at a substantially faster rate than the rate of said first standard telecommunications signal, comprising:
   a) a control circuit means for generating z pulses during y count cycle of a clock substantially at a rate of said first standard telecommunications signal; and
   b) a clock circuit means for receiving said jittered data stream, for tracking the nominal frequency of said jittered data stream, and based upon said nominal frequency, and utilizing said z pulses, generating a substantially unjittered first standard telecommunications signal at said nominal frequency of said jittered data stream, wherein z and y are integers.

2. Apparatus according to claim 1, wherein:
said control circuit means includes a divide block having a clock related to said second standard telecommunications clock signal, said divide block comprising means for dividing said clock related to said second standard telecommunications clock by x and by x+1 to create said nominal frequency, wherein said means for dividing divides said clock related to said second standard telecommunications clock by x q times, and by x+1 r times during said y count cycle,
wherein q and r are integers, and q+r=y, and z=q+1 or r+1.

3. Apparatus according to claim 2, wherein:
said control circuit means includes a modulus y counter having said nominal frequency as an input thereto, and a count decoder coupled to said modulus y counter for providing said z pulses over said y count cycle.

4. Apparatus according to claim 1, wherein:
said clock circuit includes a FIFO, a clock rate control means coupled to said FIFO and to said control circuit means, and a second divide block coupled to said clock rate control means and having said clock related to said second standard telecommunications clock as an input thereto, wherein said FIFO receives said jittered data, and wherein said control means monitors the state of said FIFO, and in response to the state of said FIFO and z control pulses, controls said second divide block to cause said second divide block to divide into said clock related to said second standard telecommunication clock to provide a substantially unjittered output clock which matches the nominal frequency of said jittered data 5. Apparatus according to claim 4, wherein:
said second divide block comprises second means for dividing said clock related to said second standard telecommunications clock by x and by x+1 to create said nominal frequency.

6. Apparatus according to claim 5, wherein:
said control means decides whether a divide by X or a divide by x+1 is desired based on said state of said FIFO.

7. Apparatus according to claim 3, wherein
said clock circuit includes a FIFO, a clock rate control means coupled to said FIFO and to said control circuit means, and a second divide block coupled to said clock rate control means and having said clock related to said second standard telecommunications clock as an input thereto, wherein said FIFO receives said jittered data, and wherein said control means monitors the state of said FIFO, and in response to the state of said FIFO and z control pulses, controls said second divide clock to cause said second divide block to divide down said clock related to said second standard telecommunication clock to provide a substantially unjittered output clock which matches the nominal frequency of said jittered data.

8. Apparatus according to claim 7, wherein:
said second divide block comprises second means for dividing said clock related to said second standard telecommunications clock by x and by x+1 to create said nominal frequency.

9. Apparatus according to claim 8, wherein:
said control means decides whether a divide by x or a divide by x+1 is desired based on said state of said FIFO.

10. Apparatus according to claim 3, wherein:
said jittered data stream has an average frequency of 2.048 Mb/sec ±200 b/sec,
y is 229, x is 28, q is 120, r is 109, and
said second standard telecommunications clock is an STS-3 clock, and said clock related to has a rate ⅜ the rate of said STS-3 clock.

11. Apparatus according to claim 9, wherein:
said jittered data stream has an average frequency of 2.048 Mb/sec ±200 b/sec,
y is 229, x is 28, q is 120, r is 109, and
said second standard telecommunications clock is an STS-3 clock, and said clock related to has a rate ⅜ the rate of said STS-3 clock.

12. Apparatus for regenerating a jittered data stream having a frequency of 1.544 Mb/sec ±200 b/sec, comprising:
a) a control circuit means for generating a plurality of pulses during a one hundred and seventy-nine count cycle of an approximately 1.544 Mb/sec clock; and
b) a clock circuit means for receiving said jittered data stream, for tracking the nominal frequency of said jittered data stream, and based upon sad nominal frequency, and utilizing said plurality of pulses, generating a substantially unjittered DS1 signal at said nominal frequency of said jittered data stream.

13. Apparatus according to claim 12, said apparatus having an STS-1 clock as an input thereto, wherein:
said control circuit means includes a divide block having said STS-1 clock as input thereto, said divide block comprising means for dividing said STS-1 clock by thirty-three and by thirty-four to create said clock of approximately 1.544 Mb/sec, wherein said means for dividing divides said STS-1 clock by thirty-three seventy-six times and by thirty-four one hundred and three times during said one hundred and seventy-nine count cycle.

14. Apparatus according to claim 13, wherein:
said control circuit means includes a modulus one hundred seventy-nine counter having said approximately 1.544 Mb/sec nominal frequency clock as an input thereto, and a count decoder coupled to said modulus one hundred seventy-nine counter for providing said plurality of control pulses over said one hundred seventy-nine count cycle.

15. Apparatus according to claim 12, said apparatus having an STS-1 clock as an input thereto, wherein:
said clock circuit includes a FIFO, a clock rate control means coupled to said FIFO and to said control circuit means, and a second divide block coupled to said clock rate control means and having said STS-1 clock as an input thereto, wherein said FIFO receives said jittered data, and wherein said control block monitors the state of said FIFO, and in response to the state of said FIFO and said plurality of control pulses, controls said second divide bock to cause sad second divide block to divide down said STS-1 clock to provide a substantially unjittered output clock which matches the nominal frequency of said jittered data.

16. Apparatus according to claim 14, wherein:

said clock circuit includes a FIFO, a clock rate control means coupled to said FIFO and to said control circuit means, and a second divide block coupled to said clock rate control means and having said STS-1 clock as an input thereto, wherein said FIFO receives said jittered data, and wherein said control block monitors the state of said FIFO, and in response to the state of said FIFO and said plurality of control pulses, controls said second divide block to cause said second divide block to divide down said STS-1 clock to provide a substantially unjittered output clock which matches the nominal frequency of said jittered data.

17. Apparatus for regenerating a jittered data stream having a frequency of 2.048 Mb/sec ±103 b/sec, comprising:
  a) a control circuit means for generating a plurality of pulses during a two hundred twenty-nine count cycle of an approximately 2.048 Mb/sec clock; and
  b) a clock circuit means for receiving said jittered data stream, for tracking the nominal frequency of said jittered data stream, and based upon said nominal frequency, and utilizing said plurality of pulses, generating a substantially unjittered 2.048 Mb/sec signal at said nominal frequency of said jittered data stream.

18. Apparatus according to claim 17, said apparatus having an STS-3 clock as an input thereto, wherein:
  said control circuit means includes a divide block having a clock related to said STS-3 clock as input thereto, said divide block comprising means for dividing said clock related to said STS-3 cock by twenty-eight and between twenty-nine to create said clock of approximately 2.048 Mb/sec, wherein said means for dividing divides said clock related to said STS-3 clock by twenty-eight one hundred twenty times and by twenty-nine one hundred and nine times during said two hundred and twenty-nine count cycle.

19. Apparatus according to claim 18, wherein:
  said control circuit means includes a modulus two hundred twenty-nine counter having said approximately 2.048 Mb/sec nominal frequency clock as an input thereto, and a count decoder coupled to said modulus two hundred twenty-nine counter for providing said plurality of control pulses over said two hundred twenty-nine count cycle.

20. Apparatus according to claim 17, said apparatus having an STS-3 clock as an input thereto, wherein:
  said clock circuit includes a FIFO, a clock rate control means coupled to said FIFO and to said control circuit means, and a second divide block coupled to said clock rate control means and having a clock related to said STS-3 clock as an input thereto, wherein said FIFO receives said jittered data, and wherein said control block monitors the state of said FIFO, and in response to the state of said FIFO and said plurality of control pulses, controls said second divide block to cause said second divide block to divide down said clock related to said STS-3 clock to provide a substantially unjittered output clock which matches the nominal frequency of said jittered data.

21. Apparatus according to claim 19, wherein:
  said clock circuit includes a FIFO, a clock rate control means coupled to said FIFO and to said control circuit means, and a second divide block coupled to said clock rate control means and having said clock related to said STS-3 clock as an input thereto, wherein said FIPO receives said jittered data, and wherein said control block monitors the state of said FIFO, and in response to the state of said FIFO and said plurality of control pulses, controls said second divide block to cause said second divide block to divide down said clock related to said STS-3 clock to provide a substantially unjittered output clock which matches the nominal frequency of said jittered data.

* * * * *